United States Patent [19]

Carlson

[11] Patent Number: 4,470,475

[45] Date of Patent: Sep. 11, 1984

[54] HYDROSTATIC DRIVE AND STEERING SYSTEM FOR AN ARTICULATED VEHICLE

[75] Inventor: Kaj Carlson, Singsby, Finland

[73] Assignee: Konetehdas-Maskinfabrik NORCAR Ky Kb, Finland

[21] Appl. No.: 513,067

[22] Filed: Jul. 12, 1983

Related U.S. Application Data

[63] Continuation-in-part of Ser. No. 236,167, Feb. 20, 1981, abandoned.

[30] Foreign Application Priority Data

Mar. 10, 1980 [FI] Finland ................................. 800732

[51] Int. Cl.³ ........................ B60K 17/10; B62D 53/00
[52] U.S. Cl. .................................. 180/6.48; 180/6.64; 180/22; 180/242; 180/307; 280/97; 280/98
[58] Field of Search ...................... 180/6.2, 6.32, 6.48, 180/6.62, 6.64, 22, 307, 308, 234, 242, 244; 280/400, 442, 458, 43, 446 R, 446 B, 81.5, 97, 98

[56] References Cited

U.S. PATENT DOCUMENTS

3,151,694 10/1964 Rogers ............................. 180/6.32
3,809,004 5/1974 Leonheart ......................... 180/22 X
3,865,208 2/1975 Crawshay et al. ................. 180/6.48

FOREIGN PATENT DOCUMENTS

2437476 2/1976 Fed. Rep. of Germany ........ 180/22
2073684 10/1981 United Kingdom ................ 180/242
854766 8/1981 U.S.S.R. ............................. 180/307

Primary Examiner—Joseph F. Peters, Jr.
Assistant Examiner—Mitchell J. Hill
Attorney, Agent, or Firm—McGlew and Tuttle

[57] ABSTRACT

A hydrostatic all wheel drive system for an articulated vehicle, which system due to its special arrangement is also able to steer the vehicle. The hydraulic system includes two powered hydraulic pumps variable as to their output capacity and flow directions. The hydraulic motors powering the front right-side wheel and the rear left-side wheel, respectively are connected via a closed hydraulic circuit in parallel relation to one of the hydraulic pumps, and the motors powering the front left-side wheel and the rear right-side wheel, respectively are connected via a second hydraulic circuit in parallel relation to the other of the hydraulic pumps. The vehicle can be steered by changing the flow rate and/or flow direction in one of the two hydraulic circuits in respect to the corresponding parameters of the other circuit.

9 Claims, 6 Drawing Figures

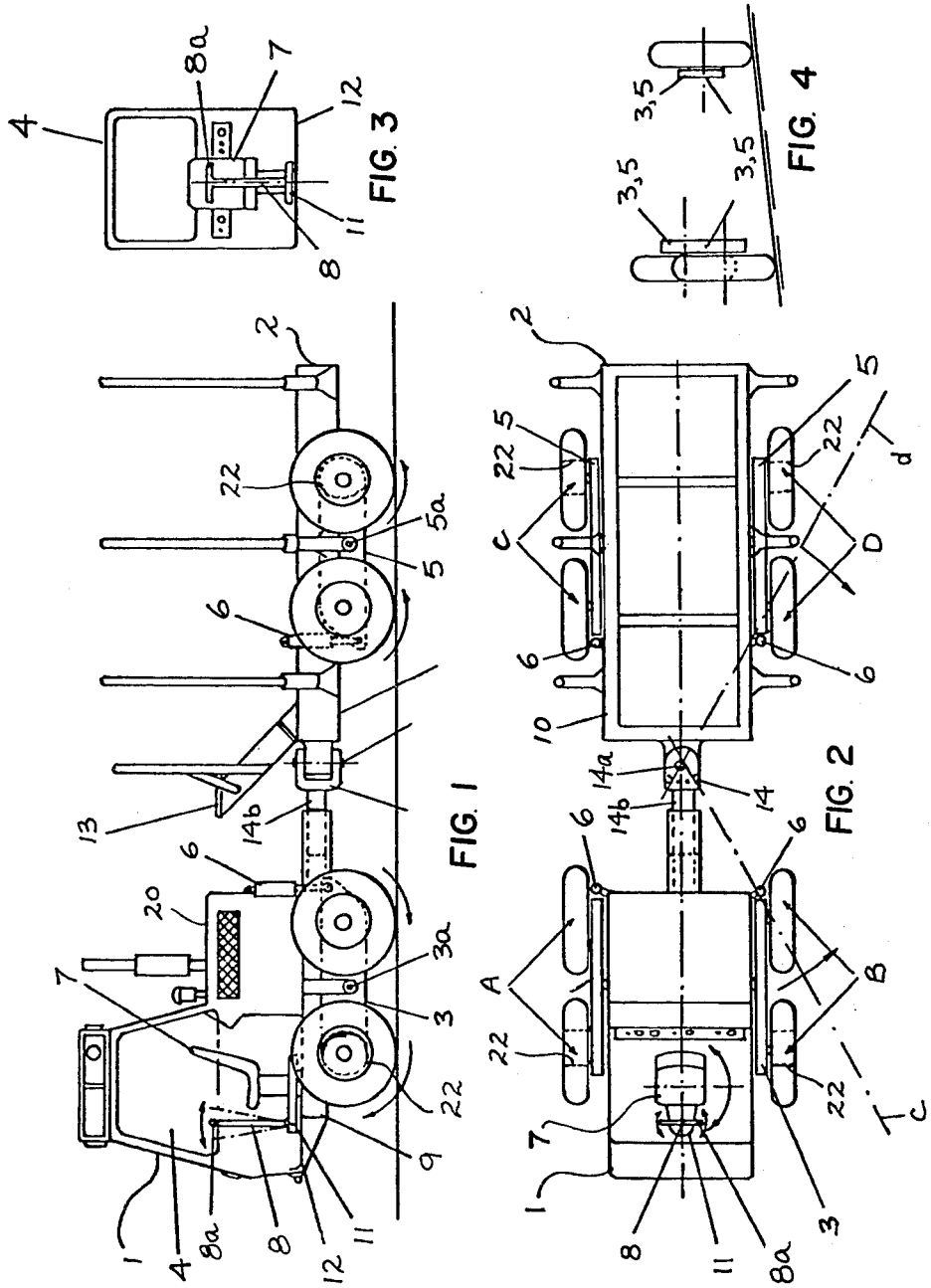

HYDROSTATIC DRIVE AND STEERING SYSTEM FOR AN ARTICULATED VEHICLE

This application is a continuation-in-part application to my previous patent application Ser. No. 236,167, filed on Feb. 20, 1981 and now abandoned.

BACKGROUND OF THE INVENTION

1. Field of the Invention

The present invention relates to a hydrostatic steering and all-wheel drive system for an articulated vehicle, especially for an articulated cross country or an off-road vehicle of the type containing a front part and a rear part, which are connected to each other by a hinge allowing the mutual turning movements of the parts essentially in the horizontal plane. Both of the vehicle parts are supported by one right-hand and one left-hand wheel, respectively, the wheels being furnished with hydraulic motors of their own. The hydraulic system includes two powered hydraulic pumps independently supplying pressurized hydraulic fluid into two separate hydraulic circuits. Both of the hydraulic circuits connect one front-wheel hydraulic motor and one rear-wheel hydraulic motor to one of the powered hydraulic pumps in order to achieve the movement of the vehicle in the forward direction and in the backward direction, respectively.

2. Prior Art

Vehicles of this kind have been described for instance in U.S. Pat. Nos. 3,151,694 and 3,865,208 including principally equal hydraulic systems to drive and steer a four-wheel driven articulated vehicle. The all-wheel driven articulated vehicles described in these patents include a usual steering system, which includes certain power means such as a hydraulic cylinder-piston arrangement by means of which the mutual angular position of the front and rear parts of the vehicle around the articulation point is changed in order to effect the steering of the vehicle.

All-wheel or four-wheel hydraulic driving systems are, however, encountered with various problems in use, which appear in different modes depending on the way in which the wheel driving hydraulic motors are connected to the pump or pumps for supplying hydraulic fluid into the motors. The hydraulic systems disclosed in these patents are principally intended to eliminate these drawbacks of the known systems, such as scuffing of the wheels on different sides of the vehicle when the vehicle moves along an arcuate path or the problems arising when one of the tractive wheels looses its contact with the ground or slips.

In order to solve these problems the system according to U.S. Pat. No. 3,151,694 uses two, essentially independent hydraulic systems, each connecting the hydraulic wheelmotors on one side of the vehicle in series to the common hydraulic pump supplying the hydraulic circuits with pressurized hydraulic fluid. The flow of the hydraulic fluid in both of the circuits can be controlled by a porportioning means, whereby a certain effected increase in flow rate in one of the circuits causes a corresponding decrease in flow in the other circuit. In a preferred embodiment of the system the control of the proportioning means is connected to the mutual angular position of the front and rear parts of the vehicle, whereby during the turning movement of the vehicle the motors driving the wheels at the inside of the turn receive a reduced portion of the fluid supplied by the pump and the motors at the outside of the turn receive a corresponding increased amount of the fluid, respectively. This kind of proportioning of the hydraulic fluid guarantees that the wheel-motors on opposite sides of the vehicle receive a hydraulic flow proportional to the travel path of the wheels.

It is, however, to be noted that the basic turning movement in the described vehicle is still achieved by a hydraulic cylinder-piston device, which is connected between the front and rear parts of the vehicle and that the object of the two-circuit hydraulic system, including the proportioning means is to assist the basic steering or turning means in their turning action, or to eliminate the negative effects caused by the turn in the mutual angular position of the vehicle parts to the driving conditions in the wheel-motors. There is no disclosure in the mentioned patent that in a four-wheeled driving embodiment of the vehicle the steering of the vehicle could be effected solely by using the proportioning means of the two independent hydraulic circuits. The only disclosure to this effect concerns the front-wheel driving embodiment of the system, which embodiment, however, is to be considered merely to relate to a vehicle intended for road conditions. By this two-wheel driving system the benefits of all-wheel drive are lost, which benefits are essential to a vehicle intended to move in terrain. Instead the two-wheel driving system alternative is beneficial when the vehicle moves a road, because the whole pumping capacity of the hydraulic pump can be used in each circuit to power the sole front-wheel motor, whereby the speed of the vehicle can be duplicated. In addition this mode of the driving system accomplishes a comprehensive way to steer the vehicle.

The system disclosed in FIG. 1 of the specification could be modified on the basis of the embodiment described in FIG. 2 thereof in such a manner that the circuits supplying hydraulic power to both wheels on one side would be controlled by the steering means of the vehicle in order to steer the vehicle. This kind of powering system would, however, be useless in practice, because the front and rear parts of the vehicle would tend to turn in the same direction, which would lead to very unstable and contradictory force direction conditions on the hinge connecting the two vehicle parts. The system disclosed in this patent has its own special problem arising from the connection of the wheel-motors on one side of the vehicle in series to the power supplying pump. There is thus no slackness between the front and rear wheels on one side of the vehicle which would eliminate the scuffing of the wheels during the initial phase of the turning movement, when the angle between the vehicle parts changes. In order to solve among other things the problems encountered in the system disclosed in U.S. Pat. No. 3,151,694, described above, the hydraulic system of U.S. Pat. No. 3,865,208 involves a preferred embodiment according to which each of the wheels powering hydraulic motors have their own hydraulic pump supplying hydraulic fluid to the motors. The hydraulic system disclosed in this patent contains also a proportioning system comparable to the system described in the earlier patent the purpose of which is also the same, i.e. to proportion the hydraulic fluid flows to the wheel motors on both sides of the vehicle in relation to the mutual angular position of the vehicle parts.

The steering of this vehicle is achieved also in conformity with the system disclosed in U.S. Pat. No.

3,151,694, whereby the hydraulic cylinder-piston arrangement mounted between the vehicle parts is activated when turning of the vehicle is desired. Nor does the later patents make any disclosure to the effect, that the steering action could be accomplished in any other manner than by using the cylinder-piston device. The only way to affect the steering movement of the vehicle using the wheels powering system disclosed in the patent is the abovementioned proportioning system which equally affects the wheel motors on the same side of the vehicle. Using solely this proportioning system for steering the vehicle would thus lead to the same indefinite situation on the hinge connecting the vehicle parts as mentioned in connection with the earlier specification. The only useful mode to steer the vehicle on the basis of U.S. Pat. No. 3,865,208 is thus obviously with the use of the hydraulic cylinder-piston device.

All the known steering systems for articulated four-wheel driven cross-country vehicles include a power device such as a hydraulic cylinder-piston arrangement mounted between the vehicle parts. The cylinder-piston arrangement has, however, encountered remarkable drawbacks in the vehicles intended to move in rough terrain, especially in vehicles provided with such a hinge between the vehicle parts, which allows the coaxial mutual twisting movements of the vehicle parts around the longitudinal axis of the vehicle. When this kind of vehicle moves in rough terrain it might come to a situation where the front part and the rear part of the vehicle, respectively are on the ground with opposite inclination. In this situation the vehicle parts are remarkably twisted in relation to each other, whereby the cylinder-piston arrangement should yield in order that the actual intended steering angle between the vehicle parts should not be changed. This kind of compensating arrangement is, however, difficult to achieve, whereby a steering system eliminating the necessity to use the cylinder-piston device for steering of the device would be desirable.

SUMMARY OF THE INVENTION

The object of the present invention is thus to achieve a hydraulic powering and steering system for articulated cross-country vehicles, which system eliminates the necessity of a powered steering element mounted between the vehicle parts and encountering problems when the vehicle is moving. The aforementioned object has been achieved by the hydraulic system according to the invention. The hydraulic system of the invention includes two separate hydraulic systems powered with two separate hydraulic pumps. The pumps are variable as to their output capacity and flow direction. Both of the pumps are connected in parallel relation via their own hydraulic circuits to one front wheel motor and to one rear wheel motor on opposite sides of the vehicle. This hydraulic system arrangement makes it possible to affect the pressures (or flow rates) and flow directions independently in each of the circuits, whereby for instance the right front wheel motor and the left rear wheel motor can be supplied with a certin hydraulic fluid flow rate than what the opposite front and rear wheel motors receive, respectively. In this driving situation the right front and left rear wheels tend to accelerate in relation to the rotation of the remaining two wheels. This results in that the front part of the vehicle turns to the left and the rear part to the right, whereby the vehicle parts instantly reach the intended mutual angular position depending on the difference in the flow rates effected in the two hydraulic circuits. The parts return to their "straight" positions immediately after the flow rates (and/or flow directions) are made equal in each of the circuits.

For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The invention will now be described in more detail below with reference to the drawings, wherein;

FIG. 1 is a side view of a cross-country vehicle in accordance with the invention;

FIG. 2 is a top view of the vehicle of FIG. 1,

FIG. 3 is a front view illustrating the driver's cabin with the control lever and the driver's chair of FIG. 1;

FIG. 4 shows the possibility of locking the bogie components of the vehicle into a desired position, when driving on laterally inclined ground;

DESCRIPTION OF THE PREFFERRED EMBODIMENT

Figure 5:
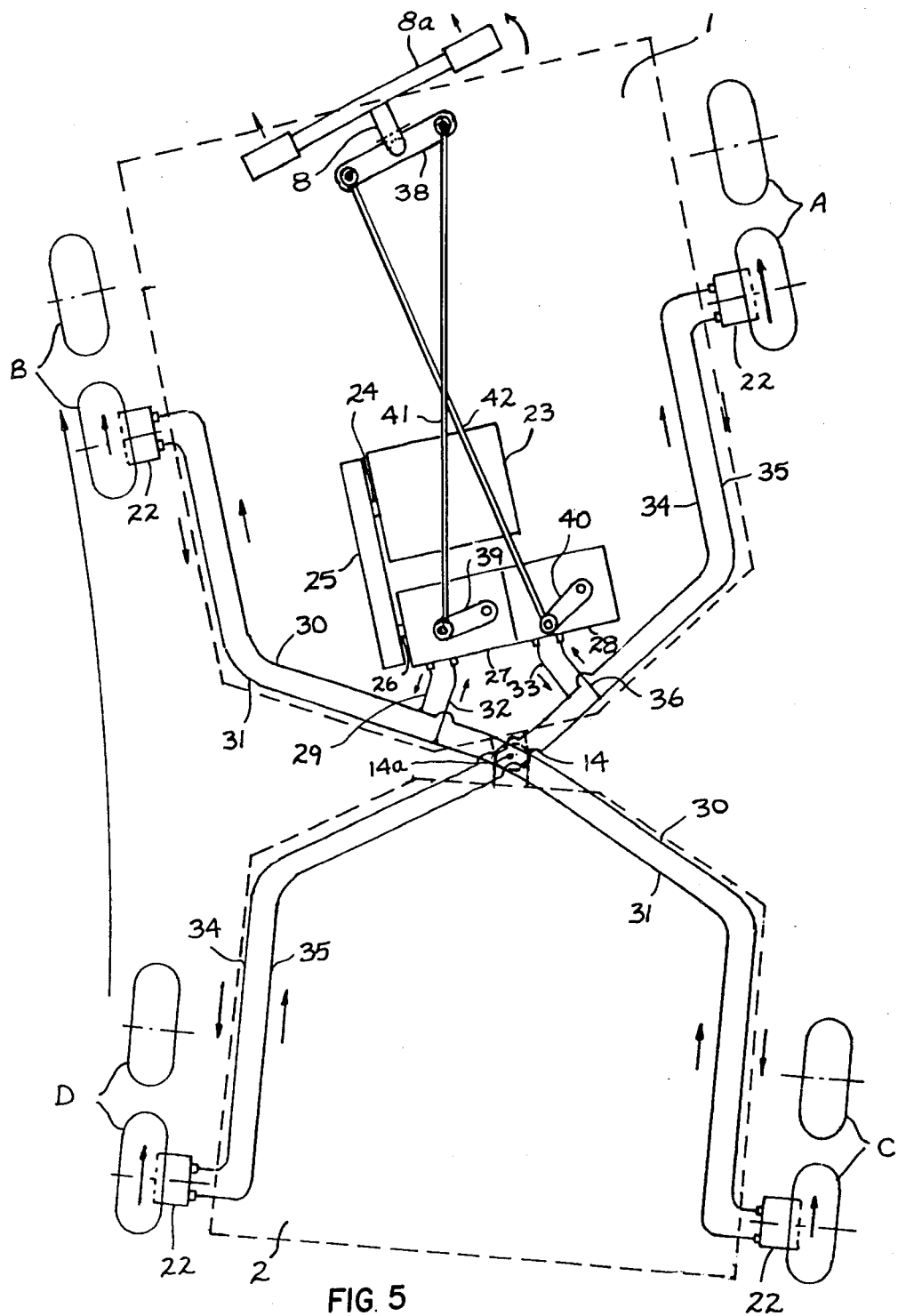
FIG. 5 is a schematic view of the hydrostatic system of the vehicle.
Figure 6:
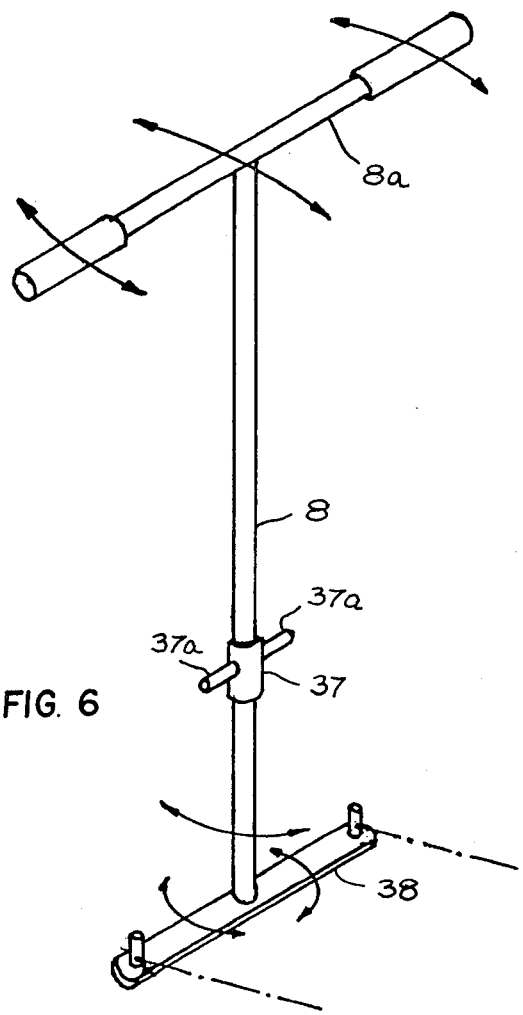
FIG. 6 is a schematic view of the control lever of the vehicle.

The drawings show a hydraulic motor-driven two-unit forest tractor which includes a power unit 1 suspended on a first bogie 3, and a load carrying trailer unit 2, suspended on a second bogie 5, coupled to the power unit by means of a drawhook 14. The drawhook 14 is constructed so that it permits a pivoting of the two vehicle units 1 and 2 in relation to each other around a shaft 14a disposed in the drawhook 14 that is positioned vertically in the neutral position. The drawhook, as well, permits turning of the two vehicle units 1 and 2 in relation to each other around the longitudinal axis 14b of the drawhook 14, but does not permit a pivoting in the vertical plane.

The power unit 1 is appropriately provided with a diesel engine 23 in housing 20, which engine 23 has an output shaft 24 passing into a distribution box 25, having an output shaft 26 coupled to two variable displacement hydraulic fluid pumps 27 and 28. These two hydraulic pumps are controlled by one single T-shaped control lever 8. Both of the hydraulic pumps 27 and 28 drive two hydraulic motors 22 respectively, each motor 22 being arranged to drive a wheel pair A, B, C and D respectively. The power unit 1 is also provided with a driver's cabin 4 wherein the control lever 8 is positioned and which cabin 4 is in the drawing, mounted at the front, but other embodiments are also possible.

The present invention is firstly concerned with the hydrostatic drive and steering system of the vehicle, which is based on the idea that the four hydraulic motors 22 are cross-connected. This means that the hydraulic motor 22 of the wheel pair A on one side of the first bogie 3 and the hydraulic motor 22 of the wheel pair D on the other side of the second bogie 5 are connected in parallel to the hydraulic pump 28 through conduits 33, 34, 35 and 36, and the hydraulic motor of the wheel pair B on the opposite side of the first bogie 3 and the hydraulic motor 22 of the wheel pair C on the opposite side of the second bogie 5 are connected in parallel to the hydraulic pump 27 through conduits 29, 30, 31 and 32. When turning of the vehicle, e.g., to the left is to be accomplished, the volume output of the hydraulic pump 28 powering the hydraulic motors 22 of the wheel pairs A and D is increased and the volume output of the hydraulic pump 27 powering the hydraulic motor 22 of the wheel pairs B and C is decreased. Thereby a turning in desired direction takes place immediately as both vehicle units 1 and 2 help in bringing the vehicle into an angular position around the vertical shaft 14a. This arrangement makes the vehicle very easy to maneuver, as a result of which it can also be driven in narrow places where high precision is required. This cross-connection permits an angular positioning of the vehicle around the vertical shaft 14a of the drawhook 14 without forward and without reverse movement of the vehicle, by changing the flow direction through one of the hydraulic pumps (27, 28) by means of the control lever (8), so that for instance the wheel pairs A and D are rotated forwardly and the wheel pairs B and C are rotated backwardly, whereby a bending of the vehicle in accordance with the lines c and d in FIG. 2 takes place. When the vehicle is, in this way, placed in an angular position, owing to the construction of the drawhook 14, it obtains a higher stability, which facilitates, e.g. loading of the vehicle. At both sides of each bogie 3 and 5, a hydraulic motor 22 is preferably connected directly to one of the wheels in each wheel pair, which wheel is appropriately connected to the other wheel of the wheel pair by means of an encased chain which runs over two equally large cog-wheels, each of them firmly mounted to a wheel of its own (not shown in FIG. 5). In this way the two wheels obtain the same speed of revolution when they are driven, irrespective of whether they are both contacting the ground or whether one of the wheels is off the ground. The hydraulic motor is appropriately a type which does not run away to high speed if the load being driven is suddenly reduced.

In order to ensure that each hydraulic motor 22 in one and the same hydraulic circuit obtains substantially the same flow of fluid, a flow equalizer is preferably inserted into each circuit (not shown).

Both halves or wheel pair supporting member of the first bogie 3 and the second bogie 5 are articulated around their respective horizontal shafts 3a and 5a. It is an advantage of this vehicle that each bogie half can, by means of its preferably vertical hydraulic cylinder 6, be separately locked in different positions in relation to a frame 9, 10 of the respective vehicle unit 1, 2. By means of this arrangement, e.g. all the bogie halves may be locked into such a position that only one of the wheels in each bogie half is in contact with the ground, whereby a higher road clearance is obtained, e.g. when crossing deep ditches or on otherwise highly broken ground. When driving on a laterally inclined plane, the bogie halves on one side of the vehicle can be locked in such a position that the vehicle stands vertically in the way shown in FIG. 4. In this way the risk of the vehicle turning over is eliminated.

The movement of the vehicle forwardly and backwardly as well as its turning movement are controlled advantageously by means of one control lever 8 placed in front of the driver's seat 7, the upper end of said lever being favourably provided with a transverse handle 8a.

The control lever 8 is turnably and pivotally linked to the floor 12 or a separate base 11 of the driver's cabin by means of a sleeve 37 provided with two radially extending horizontal taps 37a and positioned somewhat beneath the midpoint of the control lever 8. The lower end of the control lever 8 is preferably provided with a horizontal crossbar 38 parallel to the handle 8a, each end of which crossbar 38 is connected with a regulator 39, 40 of one of the hydraulic pumps 27, 28 by means of a rod 41, 42 or a wire, in such a way that the left end of the crossbar 38 is connected to the regulator 40 of the hydraulic pump 28 supplying fluid to the wheel pairs A and D and the right end is connected to the regulator 39 of the hydraulic pump 27 supplying fluid to the wheel pairs B and C. Regulators 39 and 40 control and vary the pressure or output of the pumps 27 and 28. The function of the control lever 8 is such that no fluid is passed through the hydraulic pumps 27, 28 when the control lever 8 is in its neutral position, and thus the hydraulic motors 22 and the wheel pairs A, B, C and D remain locked whereby spontaneous rolling is excluded and no separate brakes are needed. When the control lever is moved forwardly from its neutral position the hydraulic pumps 27 and 28 will supply fluid to the hydraulic motors 22 in such a direction that the hydraulic motors 22 rotate the wheel pairs A, B, C, D forwardly, whereby the speed depends on how far the control lever 8 is shifted from the neutral position. Correspondingly, backward driving is achieved with the vehicle when the control lever 8 is shifted rearwardly from its neutral position. Steering of the vehicle takes place by turning the control lever around its longitudinal axis from the netural position in the desired direction of turning. The difference in speed between the wheel pairs A and B and also between the wheel pairs D and C depends on how far the control lever 8 is turned from the neutral position. When a vehicle which is standing still is supposed to be placed into an angular position, the control lever 8 is turned somewhat in the desired direction and kept in this position until the desired angle between the two vehicle units 1 and 2 is achieved, whereupon the control lever 8 is restored to the neutral position, so that the wheels are locked. Such angular position of the vehicle gives good stability, e.g. for loading by means of a hydraulic grasping loader (not shown in the figure) mounted on the holder 13 on the load carrying trailer 2. The stability can be furthermore incresed by locking the bogies 3, 5 in their positions by means of the four hydraulic cylinders 6.

In order to facilitate the driver's work during the various working steps, the driver's seat 7 together with the control lever 8 may be appropriately arranged on a base 11 mounted onto the floor 12 of the driver's cabin 4. The base is horizontally pivotable and can be locked in different positions depending on the particular working step that the operator is performing for the time being.

The vehicle may possibly be provided with endless tracks enclosing the pair of wheels in each bogie component 3, 5.

A great advantage of the vehicle in accordance with the present invention is that the maneuverability is not affected by the type of the terrain in which the vehicle is being driven and that the steering movement takes place immediately when the driver turns the control lever 8 and furthermore that steering, driving direction and speed is controlled with one and the same control lever 8.

While a specific embodiment of the invention has been shown and described in detail to illustrate the application of the principles of the invention, it will be understood that the invention may be embodied otherwise without departing from such principles.

I claim:

1. An all-wheel driven articulated, vehicle, especially for off-road conditions, which vehicle includes:
   a front part and a rear part connected to each other by a hinge allowing the mutual pivoting movements of the vehicle parts essentially in the horizontal plane and allowing the mutual twisting movements on the vehicle parts around the longitudinal axis of the vehicle;
   front right-side and left-side wheels, respectively, non-steerably supporting the front part of the vehicle and each of the front wheels furnished with a separate hydraulic motor;
   rear right-side and left-side wheels, respectively, non-steerably supporting the rear part of the vehicle and each of the rear wheels furnished with a separate hydraulic motor;
   a first powered hydraulic pump variable as to its output capacity and flow direction;
   a second powered hydraulic pump variable as to its output capacity and flow direction;
   a first hydraulic circuit supplied by the first hydraulic pump with pressurized hydraulic fluid and connecting the hydraulic motor powering the front right-side wheel and the motor powering the rear left-side wheel in parallel relation to the first hydraulic pump;
   a second hydraulic circuit supplied by the second hydraulic pump with pressurized hydraulic fluid and connecting the hydraulic motor powering the front left-side wheel and the hydraulic motor powering the rear right-side wheel in parallel relation to the second hydraulic pump; and
   steering means to control the output capacities and the flow direction of the first and second hydraulic pumps, respectively, wherein in moving forward or backwards the vehicle parts keep their actual mutual angular positions in respect to the hinge as long as the flow directions and the output in both of the two hydraulic circuits are maintained equal, but alter the mutual angular position as soon as the output or flow direction in one of the hydraulic circuits is changed in relation to the corresponding output or flow direction in the other circuit by affecting the corresponding hydraulic pumps.

2. An all-wheel driven articulated vehicle according to the claim 1, in which the front and rear parts, respectively, are supported by two right-side and two left-side wheels, respectively, connected to form a bogie in which each of the two right-side and left-side wheels is furnished with a separate driving hydraulic motor.

3. An all-wheel driven articulated vehicle according to the claim 1 where the hydraulic pumps are supported by the front part of the vehicle and powered by a common internal combustion engine.

4. An all-wheel driven articulated vehicle according to the claim 1 or 2 wherein the rear part of the vehicle is a load carrying unit.

5. In an all-wheel-drive off-road vehicle having a front part with a longitudinal axis, left front wheel means and right front wheel means rotatably mounted to the front part for rolling parallel to the longitudinal axis of the front part;
   a rear part with a longitudinal axis, left rear wheel means and right rear wheel means rotatably mounted to the rear part for rolling parallel to the longitudinal axis of the rear part; and
   hinge means connected between the front and rear parts for permitting horizontal pivoting therebetween about a vertical axis and relative rotation therebetween about a horizontal axis passing through the longitudinal axis of at least one of the front and rear parts;
   a driving-steering device consisting essentially of:
   left front motor means connected to the left front wheel means for rotating the left front wheel means;
   right front motor means connected to the right front wheel means for rotating the right front wheel means;
   left rear motor means connected to the left rear wheel means for rotating the left rear;
   right rear motor means connected to the right rear wheel means for rotating the right rear wheel means;
   a first hydraulic circuit connected to said right front motor means and said left rear motor means for driving said right front and left rear motor means in the same direction and at the same speed;
   a second hydraulic circuit connected to said left front motor means and said right rear motor means for driving said left front and right rear motor means in the same direction and at the same speed;
   a first hydraulic pump connected to said first hydraulic circuit and having a first regulator with a plurality of forward positions, a plurality of rearward positions and a neutral position for supplying hydraulic fluid to said first circuit to drive said motor means connected to said first circuit forwardly at different speeds, rearwardly at different speeds and for holding them stationary;
   a second hydraulic pump connected to said second hydraulic circuit and having a second regulator with a plurality of forward positions, a plurality of rearward positions and a neutral position for supplying hydraulic fluid to said second circuit for driving said motor means connected to said second circuit forwardly at different speeds, rearwardly at different speeds and for holding them stationary;
   driving means connected to said first and second pumps for driving said first and second pumps; and
   a control lever connected to said first and second regulators for moving said first and second regulators into their forward, reverse and neutral positions whereby movement of said control lever to move said first regulator into a faster forward position than said second regulator causes pivoting of said front part to the left with respect to said rear part about the verticle axis of said hinge means with forward movement of the vehicle to steer the vehicle to the left, movement of the control lever to move said first regulator into a slower forward position than said second regulator causes pivoting of said front part to the right with respect to said rear part about the vertical axis of said hinge means to steer the vehicle to the right with forward movement of the vehicle, movement of said control lever to move said first regulator into a forward position and said second regulator into a rearward position causes pivoting of said front part to the left with respect to said rear part with no forward movement of said vehicle, and movement of said control lever to move said first regulator into a rearward position and said second regulator into a forward position pivots said front part to the right with respect to said rear part with no forward movement of the vehicle.

6. A device according to claim 5, wherein each wheel means includes a support member pivotably mounted to one of said front and rear parts, a pair of wheels rotatably mounted to said support member and a support member driver connected to said support member for pivoting said support member with respect to one of the front and rear parts.

7. A device according to claim 6, wherein said control lever is pivotably mounted to one of said front and rear parts for pivoting about a horizontal and a vertical axis, said control lever including a transverse handle to be held by an operator for rotating and tilting said control lever, and a cross bar, on a side of said control lever opposite from said transverse handle, said cross bar having a left side and a right side, a first tire rod connected between said left side of said cross bar and said second regulator and a second rod connected between said right side of said cross bar and said first regulator.

8. A device according to claim 7, wherein said drive means for driving said first and second pumps is an internal combustion engine.

9. A device according to claim 8, wherein said internal combustion engine, said first and second pumps and said control lever are mounted on said front part.

* * * * *